US012613339B2

(12) United States Patent
Matsumoto et al.

(10) Patent No.: US 12,613,339 B2
(45) Date of Patent: Apr. 28, 2026

(54) LIGHT WAVE DISTANCE METER

(71) Applicant: TOPCON CORPORATION, Tokyo (JP)

(72) Inventors: Masae Matsumoto, Tokyo (JP); Naoki Shoji, Tokyo (JP); Jun Abe, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 960 days.

(21) Appl. No.: 17/812,163

(22) Filed: Jul. 12, 2022

(65) Prior Publication Data

US 2023/0015894 A1      Jan. 19, 2023

(30) Foreign Application Priority Data

Jul. 16, 2021      (JP) ................................. 2021-118252

(51) Int. Cl.
G01C 3/08          (2006.01)
G01S 7/487          (2006.01)
(Continued)

(52) U.S. Cl.
CPC ............ G01S 17/26 (2020.01); G01S 7/4873 (2013.01); G01S 7/4876 (2013.01); G01S 17/36 (2013.01)

(58) Field of Classification Search
CPC ........ G01S 17/26; G01S 17/36; G01S 7/4873; G01S 7/4876
See application file for complete search history.

(56) References Cited

U.S. PATENT DOCUMENTS 10,101,441 B2    10/2018  Ohtomo et al.
11,105,926 B2    8/2021  Kikuchi et al.
(Continued)

FOREIGN PATENT DOCUMENTS

DE      102013207648 A1    11/2013
EP            3715909 A1 *  9/2020  ............. G01S 17/34
(Continued)

OTHER PUBLICATIONS

Extended European Search Report mailed Dec. 9, 2022 in connection with European Patent Application No. 22184073, 13 pgs.

*Primary Examiner* — Mark Hellner
(74) *Attorney, Agent, or Firm* — Chiesa Shahinian & Giantomasi PC

(57)          ABSTRACT
The light wave distance meter is disclosed, including: a distance measuring light-emitting unit; a light-receiving signal generating unit; and a control arithmetic unit. A light-receiving signal includes a first intermittent light-receiving signal corresponding to a first distance measuring light, a second intermittent light-receiving signal corresponding to a second distance measuring light, a third intermittent light-receiving signal corresponding to a third distance measuring light, and a fourth intermittent light-receiving signal corresponding to a fourth distance measuring light. The control arithmetic unit executes an error determination control to acquire a shift signal generated by shifting at least a phase of any one of the first to fourth intermittent light-receiving signals by $2\pi \cdot n - \pi/2$ or $2\pi \cdot n + \pi/2$, and compares the phase of the shift signal and the phase of the intermittent light-receiving signal at least between either the first frequencies or between the second frequencies.

10 Claims, 4 Drawing Sheets

(51) Int. Cl.
    G01S 17/26         (2020.01)
    G01S 17/36         (2006.01)

(56)            References Cited

U.S. PATENT DOCUMENTS

2016/0259039 A1\*   9/2016  Ohtomo ................. G01S 17/36
2018/0356522 A1   12/2018  Kikuchi et al.

FOREIGN PATENT DOCUMENTS

| JP | 6410258 | B2 | 10/2018 | |
| JP | 2018-169371 | A | 11/2018 | |
| JP | 2018169371 | \* | 11/2018 | ............ G01S 17/32 |
| JP | 6841726 | B2 | 3/2021 | |

\* cited by examiner

FIG. 2A
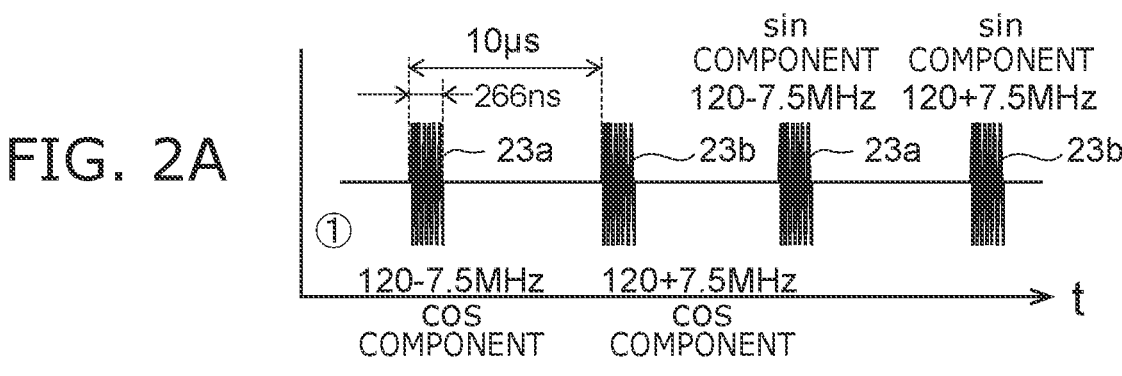
FIG. 2B
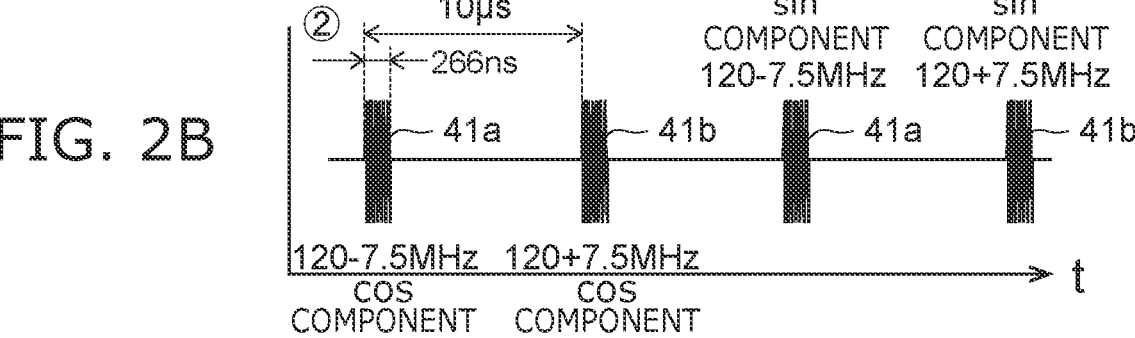
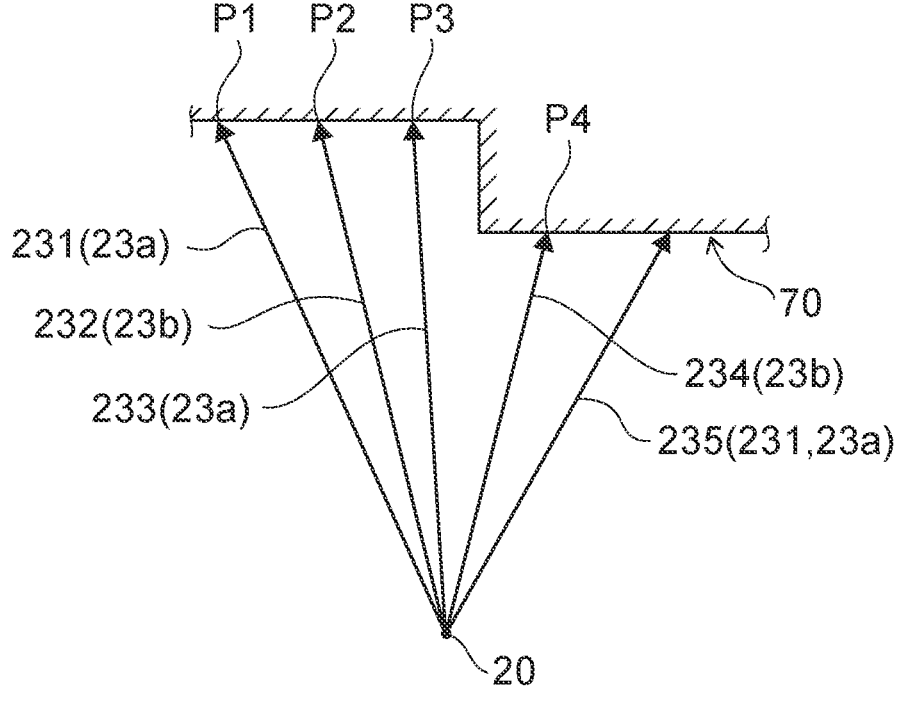
FIG. 3

LIGHT WAVE DISTANCE METER

CROSS-REFERENCE TO RELATED APPLICATIONS

This application claims the benefit of priority to Japanese Patent Application No. 2021-118252, filed Jul. 16, 2021, the disclosure of which is incorporated herein by reference in its entirety.

FIELD

The present invention relates to a light wave distance meter that creates a signal having a desired phase difference with respect to a reference signal.

BACKGROUND

A conventionally known light wave distance meter causes a light-emitting element to emit light with switching intermittent modulation signals generated by pulsing a plurality of nearby frequencies, for each of the nearby frequencies, and receives a reflected distance measuring light from the measurement target using a light-receiving element (e.g. Japanese Patent No. 6410258, Japanese Patent No. 6841726 and Japanese Patent Application Publication No. 2018-169371).

For example, a light wave distance meter disclosed in Japanese Patent No. 6410258 computes a precision measurement distance value by determining the phases of intermittent light-receiving signals, which correspond to a plurality of nearby frequencies, computes a rough measurement distance value based on the phase difference of each intermittent light-receiving signal, and determines the distance by combining the rough measurement distance value and the precision measurement distance value.

However, in a case where the measurement target has a step difference or is inclined, the light wave distance meters disclosed in Japanese Patent No. 6410258, Japanese Patent No. 6841726 and Japanese Patent Application Publication No. 2018-169371 may generate errors in the measurement distance values, and errors in the measurement distance values may not be completely eliminated. From this aspect, the light wave distance meters disclosed in Japanese Patent No. 6410258, Japanese Patent No. 6841726 and Japanese Patent Application Publication No. 2018-169371 have room for improvement.

SUMMARY OF THE INVENTION

With the foregoing in view, it is an object of the present invention to provide a light wave distance meter that can improve the elimination rate of errors in the measurement distance values.

The above problem is solved by a light wave distance meter according to the disclosed embodiment, including: a distance measuring light-emitting unit that includes a light-emitting element and emits a distance measuring light by driving the light-emitting element; a light-receiving signal generating unit including a light-receiving element that receives a reflected light from a measurement target and transmits a light-receiving signal; and a control arithmetic unit that computes a distance to the measurement target based on the light-receiving signal. The distance measuring light-emitting unit further includes: a reference signal generator configured to transmit a reference frequency signal, which is a continuous signal of a predetermined reference frequency; a frequency divider configured to generate a first modulation signal modulated with a first frequency using the reference frequency signal and a second modulation signal modulated with a second frequency which is adjacent to the first frequency, and to generate a first pulse modulation signal by pulsing the first modulation signal and a second pulse modulation signal by pulsing the second modulation signal; a phase shifter configured to generate a third pulse modulation signal by shifting the first pulse modulation signal by time equivalent to $2\pi \cdot n - \pi/2$ or $2\pi \cdot n + \pi/2$, and a fourth pulse modulation signal by shifting the second pulse modulation signal by time equivalent to $2\pi \cdot n - \pi/2$ or $2\pi \cdot n + \pi/2$; and a light emission driving unit configured to drive the light-emitting element based on the first pulse modulation signal, the second pulse modulation signal, the third pulse modulation signal and the fourth pulse modulation signal, and to alternately emit, by time division, a first distance measuring light based on the first pulse modulation signal, a second distance measuring light based on the second pulse modulation signal, a third distance measuring light based on the third pulse modulation signal, and a fourth distance measuring light based on the fourth pulse modulation signal. The light-receiving signal includes: a first intermittent light-receiving signal corresponding to the first distance measuring light; a second intermittent light-receiving signal corresponding to the second distance measuring light; a third intermittent light-receiving signal corresponding to the third distance measuring light; and a fourth intermittent light-receiving signal corresponding to the fourth distance measuring light. The control arithmetic unit executes an error determination control to acquire a shift signal generated by shifting at least a phase of any one of the first to fourth intermittent light-receiving signals by $2\pi \cdot n - \pi/2$ or $2\pi \cdot n + \pi/2$, and compare the phase of the shift signal and the phase of the intermittent light-receiving signal at least between the first frequencies or between the second frequencies.

According to the light wave distance meter of the disclosed embodiment, the control arithmetic unit acquires the shift signal generated by shifting at least one of the following signals by $2\pi \cdot n - \pi/2$ or $2\pi \cdot n + \pi/2$: the first intermittent light-receiving signal corresponding to the first distance measuring light emitted based on the first pulse modulation signal; the second intermittent light-receiving signal corresponding to the second distance measuring light emitted based on the second pulse modulation signal; the third intermittent light-receiving signal corresponding to the third distance measuring light emitted based on the third pulse modulation signal which has been shifted by time equivalent to $2\pi \cdot n - \pi/2$ or $2\pi \cdot n + \pi/2$, and the fourth intermittent light-receiving signal corresponding to the fourth distance measuring light emitted based on the fourth pulse modulation signal which has been shifted by time equivalent to $2\pi \cdot n - \pi/2$ or $2\pi \cdot n + \pi/2$. Thereby in a case where the measurement target does not have a step difference, a time series-based change is not generated in the phase of the acquired data, hence the phase of the shift signal matches with the phase of the intermittent light-receiving signal modulated with a same frequency. Therefore, the control arithmetic unit executes the error determination control to compare the phase of the shift signal and the phase of the intermittent light-receiving signal modulated with a same frequency. Thus, the light wave distance meter according to the disclosed embodiment uses the data on a phase that is distant in a time-series, whereby the accuracy of error determination can be improved, and the elimination rate of errors in the measurement distance values can be improved.

In the light wave distance meter according to the disclosed embodiment, it is preferable that the control arithmetic unit compares the phase of the shift signal determined by performing frequency analysis on a center portion in the signal width of the intermittent light-receiving signal to acquire the shift signal, and the phase of the intermittent light-receiving signal determined by performing frequency analysis on the center portion in the signal width of the intermittent light-receiving signal.

According to the light wave distance meter according to the disclosed embodiment, the control arithmetic unit can compare the phase of the shift signal in a relatively clean and stable region and the phase of the intermittent light-receiving signal in a relatively clean and stable region. Thereby the light wave distance meter according to the disclosed embodiment can further improve the accuracy of the error determination, and further improve the elimination rate of errors in the measurement distance values.

In the light wave distance meter according to the disclosed embodiment, it is preferable that the control arithmetic unit executes a control to eliminate the intermittent light-receiving signal in a case where the phase difference between the phase of the shift signal and the phase of the intermittent light-receiving signal is a predetermined threshold value or more.

According to the light wave distance meter of the disclosed embodiment, the control arithmetic unit eliminates the intermittent light-receiving signal in a case where the phase difference between the phase of the shift signal and the phase of the intermittent light-receiving signal is a predetermined threshold value or more. Therefore the light wave distance meter according to the disclosed embodiment can eliminate a light-receiving signal of which phase difference between the phase of the shift signal and the phase of the intermittent light-receiving signal is the predetermined threshold value or more, while using an effective light-receiving signal of which phase difference between the phase of the shift signal and the phase of the intermittent light-receiving signal is less than the predetermined threshold value, whereby the elimination of errors in the measurement distance values can be more accurately executed.

In the control arithmetic unit according to the disclosed embodiment, it is preferable that the control arithmetic unit sets the predetermined threshold value in accordance with the distance to the measurement target.

According to the light wave distance meter of the disclosed embodiment, the control arithmetic unit uses a predetermined threshold that is set in accordance with the distance to the measurement target, and eliminates the light-receiving signal of which phase difference between the phase of the shift signal and the phase of the intermittent light-receiving signal is the predetermined distance or more, while using an effective light-receiving signal of which phase difference between the phase of the shift signal and the phase of the intermittent light-receiving signal is less than the predetermined threshold value. Thereby the light wave distance meter according to the disclosed embodiment can execute the elimination of errors in the measurement distance values more accurately.

In the control arithmetic unit according to the disclosed embodiment, it is preferable that the control arithmetic unit executes a control to match the center position between the first intermittent light-receiving signal and the third intermittent light-receiving signal, and the center position between the second intermittent light-receiving signal and the fourth intermittent light-receiving signal.

According to the control arithmetic unit of the disclosed embodiment, the center position between the first intermittent light-receiving signal and the third intermittent light-receiving signal matches with the center position between the second intermittent light-receiving signal and the fourth intermittent light-receiving signal, therefore the light wave distance meter according to the disclosed embodiment can suppress the generation of errors in the acquired data.

According to the disclosed embodiment, a light wave distance meter that can improve the elimination rate of errors in the measurement distance values can be provided.

BRIEF DESCRIPTION OF THE DRAWINGS

FIGS. 2A and 2B are diagrams indicating a pulse modulation signal and an intermittent light-receiving signal of the present embodiment;

FIG. 3 is a schematic diagram exemplifying a case where a measurement target has a step difference;

DESCRIPTION OF THE PREFERRED EMBODIMENTS

Preferred embodiments of the present invention will be described in detail with reference to the drawings.

The embodiments described below are preferable application examples of the disclosed embodiment, and various technically desirable limitations are included, but the scope of the disclosed embodiment is not limited to these embodiments, unless such a limitation of the disclosed embodiment is especially indicated in the description below. In each drawing, a same composing element is denoted with a same reference sign, and detailed redundant description may be omitted.

Figure 1:
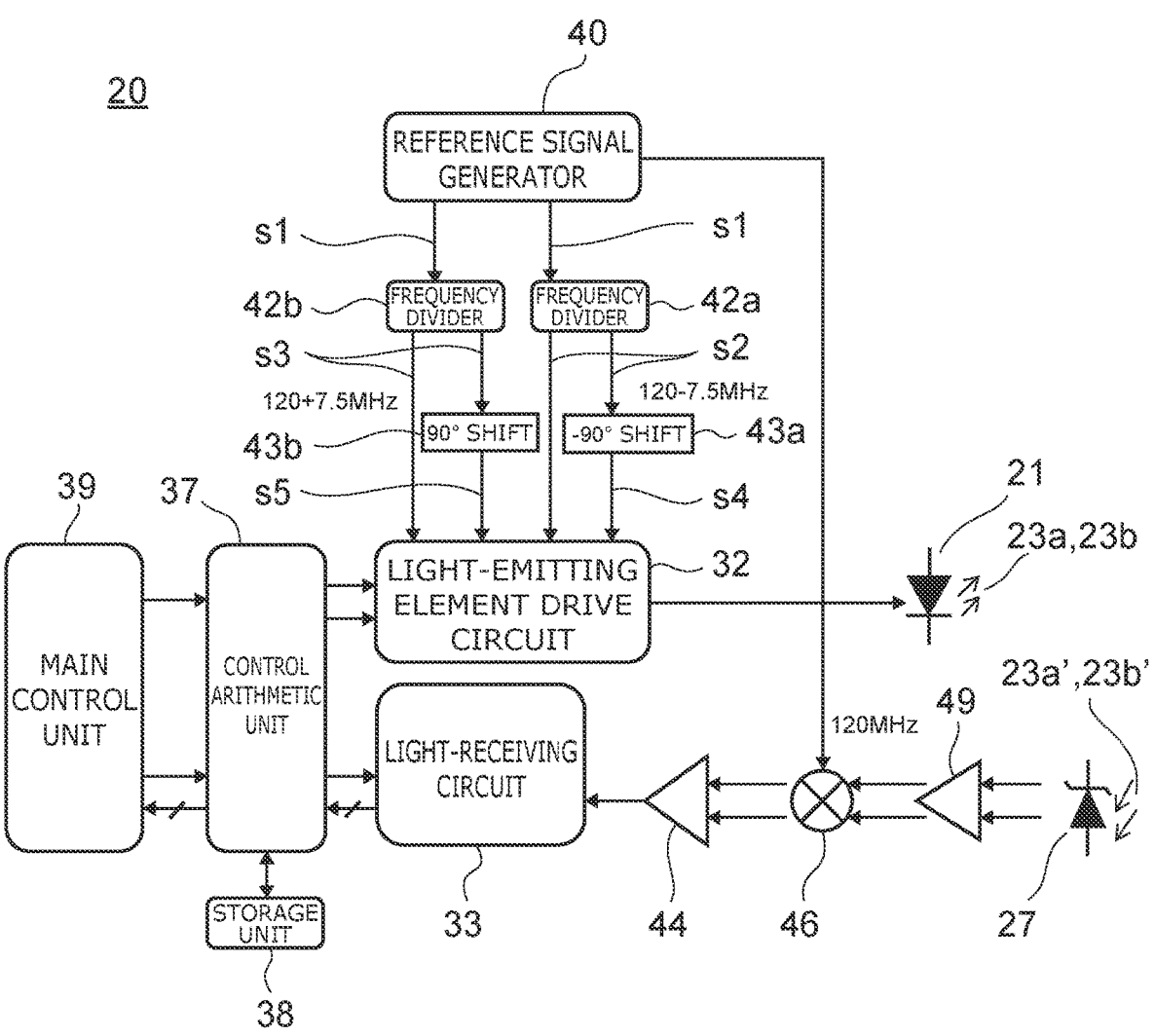
FIG. 1 is a block diagram depicting a general configuration of a light wave distance meter according to an embodiment.

FIG. 1 is a block diagram depicting a general configuration of a light wave distance meter according to an embodiment.

FIGS. 2A and 2B are diagrams indicating a pulse modulation signal and an intermittent light-receiving signal of the present embodiment.

In recent years a burst light emission system is used for a light wave distance meter, and in this system, the light is intermittently emitted (burst light emission) so that the light intensity is increased to receive sufficient light quantity and the light-emitting load rate becomes a predetermined value or less. As described below, the light wave distance meter 20 according to the present embodiment is a light wave distance meter using the burst light emission system.

In the light wave distance meter 20 according to the present embodiment, a reference signal generator 40 emits a reference frequency signal s1 having a predetermined reference frequency fc. The numeric values in the following description may be changed as necessary in accordance with the measurement distance and the measurement accuracy. For example, in the following description, the reference frequency fc is 120 MHz.

The reference frequency signal s1 emitted from the reference signal generator 40 is divided by a first frequency divider 42a and a second frequency divider 42b respectively, so that the reference frequency fc is divided into 1/n, whereby a divided frequency signal having frequency f is generated. The frequency f is fc/n, and if the first frequency divider 42a and the second frequency divider 42b are frequency dividers that divides 120 MHz of the reference frequency fc into 1/16 respectively, the frequency f becomes 7.5 MHz.

The first frequency divider 42a generates a first modulation signal which is modulated by fc−f [Hz] (120−7.5 MHz in the present embodiment) based on the frequency dividing signal and the reference frequency signal s1. Further, the first frequency divider 42a pulses the first modulation signal, which is a continuous signal, and converts the first modulation signal into a first pulse modulation signal s2, which is an intermittent signal emitted at predetermined time intervals. This means that the pulses of the first pulse modulation signal s2 include the frequency of fc−f [Hz] (120 MHz−7.5 MHz). For example, the first pulse modulation signal s2 becomes a signal having a cos waveform based on the position where the first modulation signal is pulsed. Then the first frequency divider 42a outputs the first pulse modulation signal s2 to the light-emitting element drive circuit 32 and a first phase shifter 43a. fc−f [Hz] (120 MHz−7.5 MHz) of the present embodiment is an example of the "first frequency" of the disclosed embodiment.

The second frequency divider 42b generates a second modulation signal which is modified with fc+f [Hz] (120 MHz+7.5 MHz in the present embodiment) based on the frequency dividing signal and the reference frequency signal s1. Further, the second frequency divider 42b pulses the second modulation signal, which is a continuous signal, and converts the second modulation signal into a second pulse modulation signal s3, which is an intermittent signal emitted at predetermined time intervals. This means that the pulses of the second pulse modulation signal s3 include the frequency of fc+f [Hz](120 MHz+7.5 MHz). For example, the second pulse modulation signal s3 becomes a signal having a cos waveform based on the position where the second modulation signal is pulsed. Then the second frequency divider 42b outputs the second pulse modulation signal s3 to the light-emitting element drive circuit 32 and the second phase shifter 43b. fc+f [Hz] (120 MHz+7.5 MHz) is an example of the "second frequency" of the disclosed embodiment.

Therefore, the first frequency divider 42a and the second frequency divider 42b generates the two modulation signal fc+f [Hz] and fc−f [Hz], of which frequencies are adjacent to each other, and the pulse modulation signals by pulsing the modulation signals.

A first phase shifter 43a computes the shift time, which is equivalent to the phase difference based on the first pulse modulation signal s2 and the predetermined phase difference, generates a third pulse modulation signal s4 by shifting the first pulse modulation signal s2 by the predetermined shift time in the predetermined shift direction, and outputs the third pulse modulation signal s4 to a light-emitting element drive circuit 32. In the present embodiment, the first phase shifter 43a generates the third pulse modulation signal s4 by shifting the first pulse modulation signal s2 by the time equivalent to −π/2 (−90°) phase, and outputs the third pulse modulation signal s4 to the light-emitting element drive circuit 32. Just like the case of the first pulse modulation signal s2, the third pulse modulation signal s4 includes the frequency of fc−f [Hz](120 MHz−7.5 MHz in the present embodiment). The third pulse modulation signal s4, which is a signal generated by shifting the first pulse modulation signal s2 by −π/2 (−90°) phase, becomes a signal having the sin waveform based on the position where the third pulse modulation signal s4 is pulsed, for example.

A second phase shifter 43b computes the shift time, which is equivalent to the phase difference based on the second pulse modulation signal s3 and the predetermined phase difference, generates a fourth pulse modulation signal s5 by shifting the second pulse modulation signal s3 by the predetermined shift time in the predetermined shift direction, and outputs the fourth pulse modulation signal s5 to the light-emitting element drive circuit 32. In the present embodiment, the second phase shifter 43b generates the fourth pulse generation signal s5 by shifting the second pulse modulation signal s3 by the time equivalent to the π/2 (90°) phase, and outputs the fourth pulse modulation signal s5 to the light-emitting element drive circuit 32. Just like the second pulse modulation signal s3, the fourth pulse modulation signal s5 includes the frequency of fc+f [Hz] (120 MHz+7.5 MHz in the present embodiment). The fourth pulse modulation signal s5, which is a signal generated by shifting the second pulse modulation signal s3 by the π/2 (90°) phase, becomes a signal having the −sin waveform based on the position where the fourth pulse modulation signal s5 is pulsed, for example.

The shift time, when the first phase shifter 43a and the second phase shifter 43b, to perform respective shifting, is not limited to the time equivalent to ±π/2 (±90°) phase, may be time equivalent to the phase expressed by the following expression.

$$2\pi \cdot n + k \cdot 2\pi / a \qquad \text{Expression}$$

(n=natural number; k=1, 2, . . . a; a=constant)

For example, the first phase shifter 43a generates the third pulse modulation signal s4 by shifting the first pulse modulation signal s2 by the time equivalent to $2\pi \cdot n - \pi/2$ or $2\pi \cdot n + \pi/2$. Further, for example, the second phase shifter 43b generates the fourth pulse modulation signal s5 by shifting the second pulse modulation signal s3 by the time equivalent to $2\pi \cdot n - \pi/2$ or $2\pi \cdot n + \pi/2$. In the following description, it is assumed as an example that the first phase shifter 43a generates the third pulse modulation signal s4 by shifting the first pulse modulation signal s2 by the time equivalent to the −π/2 (−90°) phase, and the second phase shifter 43b generates the fourth pulse modulation signal s5 by shifting the second pulse modulation signal s3 by the π/2 (90°) phase.

Then a light-emitting element drive circuit 32 causes a light-emitting element 21 to perform burst emission (intermittent emission) by a light emission drive signal, which includes the first pulse modulation signal s2, the second pulse modulation signal s3, the third pulse modulation signal s4 and the fourth pulse modulation signal s5. In other words, the light-emitting element drive circuit 36 drives the light-emitting element 21 by the light emission drive signal, including: the first pulse modulation signal s2 which is generated based on the first modulation signal modulated by 120 MHz−7.5 MHz; the second pulse modulation signal s3 which is based on the second modulation signal modulated by 120 MHz+7.5 MHz; the third pulse modulation signal s4 which is modulated by 120 MHz−7.5 MHz and is shifted by the time equivalent to the −90° phase; and the fourth pulse modulation signal s5 which is modulated with 120 MHz+7.5 MHz and is shifted by the time equivalent to the 90° phase. The light-emitting element drive circuit 32 of the present embodiment is an example of the "light emission driving unit" of the disclosed embodiment.

The light-emitting element 21 (e.g. laser diode: LD) is driven by the light-emitting element drive circuit 32, and emits a laser beam of which intensity is modulated to a predetermined frequency. The laser beam is split into the distance measuring lights 23a and 23b and an internal reference light by a half mirror (not illustrated). The distance measuring lights 23a and 23b transmitted through the half mirror are emitted to a measurement target (not illustrated) via an objective lens (not illustrated). The reflected distance measuring lights 23a' and 23b', which were reflected by the measurement target, are received by a light-receiving element 27 via the objective lens and the half mirror. A photodiode, such as an avalanche photodiode (APD), is used for the light-receiving element 27.

The light-emitting element 21, the light-emitting element drive circuit 32, and the like, constitute the "distance measuring light-emitting unit" of the disclosed embodiment. The light-receiving element 27, the light-receiving circuit 33, and the like, constitute the "light-receiving signal generating unit" of the disclosed embodiment.

For example, as indicated in FIG. 2A, the cycle of the burst light emission (burst cycle) is 10 μs (100 kHz); and the burst light-emitting time is 266 ns.

The light-emitting element drive circuit 32 alternately performs light emission by time division, based on the first pulse modulation signal s2 having 120 MHz+7.5 MHz (cos component), the second pulse modulation signal s3 having 120 MHz+7.5 MHz (cos component), the third pulse modulation signal s4 at 120 MHz−7.5 MHz (sin component), which has been shifted by time equivalent to the −90° phase, and the fourth pulse modulation signal s5 having 120 MHz+7.5 MHz (sin component), which has been shifted by a time equivalent to the 90° phase (see FIG. 2A).

With respect to the first pulse modulation signal s2 having 120 MHz−7.5 MHz and the second pulse modulation signal s3 at 120 MHz+7.5 MHz indicated in FIG. 2A, the third pulse modulation signal s4 having 120 MHz−7.5 MHz and the fourth pulse modulation signal s5 having 120 MHz+7.5 MHz which are transmitted with delay are modulation signals which have been shifted by time equivalent to the −90° phase and 90° phase respectively.

Therefore, the distance measuring light 23a modulated by 120 MHz−7.5 MHz and the distance measuring light 23a which has been shifted by time equivalent to the −90° phase and modulated by 120 MHz+7.5 MHz, and the distance measuring light 23b modulated with 120 MHz+7.5 MHz or the distance measuring light 23b which has been shifted by time equivalent to the 90° phase modulated with 120 MHz+7.5 MHz are alternately burst-emitted by time division from the light-emitting element 21 at a burst light-emitting cycle (10 μs).

As mentioned above, the laser beam emitted from the light-emitting element 21 is split into the distance measuring lights 23a and 23b and the internal reference light by the half mirror (not illustrated). The signal processing for the distance measuring lights 23a and 23b and the signal processing for the internal reference light are the same. Therefore, in the following only the signal processing for the distance measuring lights 23a and 23b will be described.

As indicated in FIG. 1, the reflected distance measuring lights 23a and 23b enter the light-receiving element 27. Then the intermittent light-receiving signals 41a and 41b are alternately emitted from the light-receiving element 27 as indicated in FIG. 2B. The intermittent light-receiving signals 41a and 41b correspond to the distance measuring lights 23a and 23b.

In other words, the reflected distance measuring light 23a' is a pulse modulation light based on the first pulse modulation signal s2 and the third pulse modulation signal s4 having fc−f [Hz] (120 MHz−7.5 MHz). Therefore, the light-receiving signal emitted from the light-receiving element 27 is outputted as a pulse, and at the same time, becomes the intermittent light-receiving signal 41a having the frequency of fc−f [Hz] (120 MHz−7.5 MHz). The reflected distance measuring light 23b' is a pulse modulation light based on the second pulse modulation signal s3 and the fourth pulse modulation signal s5 of fc+f [Hz] (120 MHz+7.5 MHz). Therefore, the light-receiving signal emitted from the light-receiving element 27 is output as a pulse, and at the same time, becomes the intermittent light-receiving signal 41b having the frequency of fc+f [Hz] (120 MHz+7.5 MHz).

The intermittent light-receiving signal 41a is a light-receiving signal having a 266 ns signal width and includes 120 MHz−7.5 MHz and 120 MHz−7.5 MHz which has been shifted by time equivalent to the −π/2 (−90°) phase. In the same manner, the intermittent light-receiving signal 41b is a light-receiving signal having a 266 ns signal width and includes 120 MHz+7.5 MHz and 120 MHz+7.5 MHz which has been shifted by time equivalent to the π/2 (90°) phase.

As mentioned above, the light-emitting cycle of the light-emitting element 21 is 10 μs (100 kHz). Therefore, the generation cycle (generation internal) of the intermittent light-receiving signals 41a and 41b is 10 μs. The light-emitting internal is set to be sufficiently longer than the time required for the distance measuring light to reach the measurement target and return, and is appropriately set in accordance with the maximum distance required to measure the distance.

The intermittent light-receiving signals 41a and 41b are amplified by an amplifier 49, are mixed with the reference frequency signal having 120 MHz in a mixing circuit 46, and become the intermittent modulation signals with +7.5 MHz and −7.5 MHz. The intermittent modulation signals having ±7.5 MHz are amplified by an amplifier 44, and are outputted to a light-receiving circuit 33.

For the intermittent modulation signals which have been shifted by time equivalent to the ±90° phase, out of the intermittent modulation signals having ±7.5 MHz, the light-receiving circuit 33 performs signal processing (recovery processing) so that the intermittent light-receiving signals, which are delayed by time equivalent to the ±90° phase, are advanced by time equivalent to the ±90° phase. Further, the light-receiving circuit 33 performs required signal processing (e.g. A/D conversion) for the intermittent modulation signals having ±7.5 MHz, and the processed intermittent modulation signals are inputted to the control arithmetic unit 37. Since the recovery processing is executed on the intermittent modulation signals having ±7.5 MHz which have been shifted by the time equivalent to the ±90° phase, the signals having ±7.5 MHz and the signals at ±7.5 MHz in a different phase can be inputted without delay.

The control arithmetic unit 37 executes various programs stored in the storage unit 38, and executes arithmetic operation required for measuring a distance. The control arithmetic unit 37 also controls the light-emitting element drive circuit 32 and controls the light-emitting state of the light-emitting element 21 via the light-emitting element drive circuit 32. Further, the control arithmetic unit 37 switches the reflected distance measuring lights 23a' and 23b' that enter the light-receiving element 27 and the internal reference light.

Furthermore, the control arithmetic unit 37 determines the phase difference (light-receiving time difference) between the internal reference light and the reflected distance measuring lights 23a' and 23b' from the light-receiving signal, whereby the distance is computed. Moreover, the control arithmetic unit 37 eliminates the unstable elements of the light-receiving circuit 33 (e.g. drift on the circuit) by determining the phase difference between the internal reference light and the reflected distance measuring lights 23a' and 23b'. The operation of the control arithmetic unit 37 of the present embodiment will be described later in detail.

A storage unit 38 stores various programs for performing arithmetic operations required for measurement. For example, the storage unit 38 stores a signal processing program to execute signal processing (e.g. amplifying and A/D converting signals outputted from the light-receiving element 27), an arithmetic program to execute discrete Fourier transform (DFT) on burst signals, a program to convert the result of DFT into the phase and amplitude, an arithmetic program to extract the phase and amplitude of primary frequency, secondary frequency, etc. acquired by executing DFT, and the like. Furthermore, the storage unit 38 stores various data, such as the distance measurement result and arithmetic operation result.

A main control unit 39 controls the distance measurement activation of the light wave distance meter 20, and controls the arithmetic processing of the control arithmetic unit 37. The main control unit 39 and the control arithmetic unit 37 may be integrated into one control unit.

The internal reference light including 120 MHz+7.5 MHz and 120 MHz+7.5 MHz which has been shifted by time equivalent to the 90° phase, and the internal reference light including 120 MHz−7.5 MHz and 120 MHz−7.5 MHz which has been shifted by time equivalent to the −90° phase, enter the light-receiving element 27 by time division. For the light-receiving signals emitted from the light-receiving element 27 which the internal reference light has entered as well, processing the same as for the distance measuring lights 23a and 23b is performed.

The optical path length of the internal reference light is constant. Therefore, in a state where circuits, such as the light-receiving circuit 33, are stable, the generation timing of the light emission drive signal and the generation timing of the light-receiving signal which the light-receiving circuit 33 emits by receiving the internal reference light are fixed. Therefore, in the state where circuits, such as the light-receiving circuit 33, are stable, the relationship between the generation timing of the intermittent light-receiving signal which the light-receiving circuit 33 emits by receiving the internal reference light, and the generation timing of the light emission drive signal, is also fixed. As a consequence, the light-receiving signal of the internal reference light emitted by the light-receiving circuit 33 becomes a signal based on the light emission drive signal.

This means that the light emission drive signal, emitted by the light-emitting element drive circuit 32, may be used as a signal for reference.

An operation of the control arithmetic unit 37 of the present embodiment will now be described with reference to the drawings.

FIG. 3 is a schematic diagram exemplifying a case where a measurement target has a step difference.

Figures 4, 5:
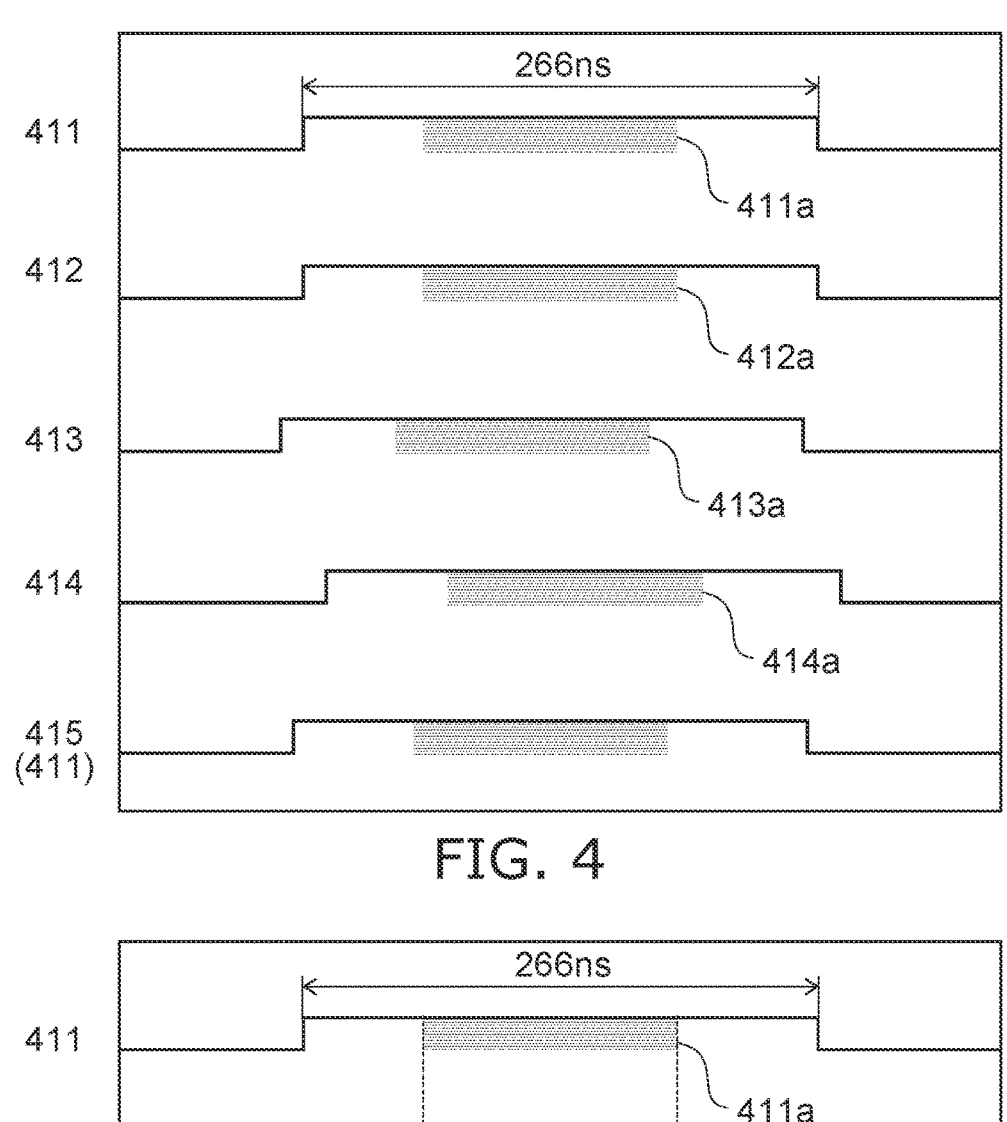
FIG. 4 is a schematic diagram indicating an example of light-receiving signals of the present embodiment.
FIG. 5 is a schematic diagram for describing error determination control executed by a control arithmetic unit of the present embodiment.

FIG. 4 is a schematic diagram indicating an example of the light-receiving signals of the present embodiment.

FIG. 5 is a schematic diagram for describing error determination control executed by the control arithmetic unit of the present embodiment.

The operation example of the control arithmetic unit 37 in the case where the measurement target 70 has a step difference will be described with reference to FIGS. 3 to 5.

In the following description, a distance measuring light 23a, emitted from the light-emitting element 21 based on the first pulse modulation signal s2 having 120 MHz−7.5 MHz (cos component), is called the "first distance-measuring unit 231", for explanatory convenience. A distance measuring light 23b, emitted from the light-emitting element 21 based on the second pulse modulation signal s3 having 120 MHz+ 7.5 MHz (cos component), is called the "second distance measuring light 232". The distance measuring light 23a, emitted from the light-emitting element 21 based on the third pulse modulation signal s4 having 120 MHz−7.5 MHz (sin component), which has been shifted by time equivalent to the −90° phase is called the "third distance measuring light 233". A distance measuring light 23b, emitted from the light-emitting element 21 based on the fourth pulse modulation signal s5 having 120 MHz+7.5 MHz (sin component), which has been shifted by time equivalent to the 90° phase, is called the "fourth distance measuring light 234".

As described above with reference to FIG. 2A, the first distance measuring light 231, the second distance measuring light 232, the third distance measuring light 233 and the fourth distance measuring light 234 are alternately emitted from the light-emitting element 21 in this sequence. After the fourth distance measuring light 234 is emitted, the first distance measuring light 231, the second distance measuring light 232, the third distance measuring light 233 and the fourth distance measuring light 234 are alternately emitted from the light-emitting element 21 again in this sequence. Therefore, the first distance measuring light 235 indicated in FIG. 3 is equivalent to the first distance measuring light 231. In the example illustrated in FIG. 3, the light wave distance meter 20 scans the measurement target 70 from left to right with the distance measuring light.

In the following description, the light-receiving signal corresponding to the first distance measuring light 231 is called the "first intermittent light-receiving signal 411". The light-receiving signal corresponding to the second distance measuring light 232 is called the "second intermittent light-receiving signal 412". The light-receiving signal corresponding to the third distance measuring light 233 is called the "third intermittent light-receiving signal 413". The light-receiving signal corresponding to the fourth distance measuring light 234 is called the "fourth intermittent light-receiving signal 414". Since each light-receiving signal corresponds to each distance measuring light, the first intermittent light-receiving signal 411, the second intermittent light-receiving signal 412, the third intermittent light-receiving signal 413 and the fourth intermittent light-receiving signal 414 are emitted alternately in this sequence from the light-receiving element 27, as indicated in FIG. 4. The first distance measuring light 235 corresponds to the first distance measuring light 231, hence the first intermittent light-receiving signal 415 corresponding to the first distance measuring light 235 is equivalent to the first intermittent light-receiving signal 411.

Here as indicated in FIG. 4, the control arithmetic unit 37 of the present embodiment acquires a comparison signal 411a from the light-receiving signal at the center portion in the signal width (266 ns in the present embodiment) out of the first intermittent light-receiving signal 411. In the same manner, the control arithmetic unit 37 acquires a comparison signal 412a from the light-receiving signal at the center portion in the signal width out of the second intermittent light-receiving signal 412. The control arithmetic unit 37 acquires a comparison signal 413a from the light-receiving signal at the center portion in the signal width of the third intermittent light-receiving signal 413. The control arithmetic unit 37 acquires a comparison signal 414a from the light-receiving signal at the center portion out of the signal width of the fourth intermittent light-receiving signal 414.

The control arithmetic unit 37 of the present embodiment also acquires a shift signal in which at least one of the phases of the first to fourth intermittent light-receiving signals 411, 412, 413 and 414 has been shifted by $-\pi/2$ or $\pi/2$. In the example indicated in FIG. 5, the control arithmetic unit 37 acquires the shift signal 413b, in which the phase has been shifted with respect to the comparison signal 413a by $\pi/2$ ($-90°$), from the light-receiving signal at the center portion in the signal width out of the third intermittent light-receiving signal 413. In the same manner, the control arithmetic unit 37 acquires a shift signal 414b, in which the phase has been shifted with respect to the comparison signal 414a by $-\pi/2$ ($-90°$), from the light-receiving signal at the center portion in the signal width out of the fourth intermittent light-receiving signal 414.

Then the control arithmetic unit 37 executes error determination control by comparing the phase of the shift signal 413b and the phase of the comparison signal 411a, both modulated with 120 MHz–7.5 MHz. Specifically, the control arithmetic unit 37 executes error determination control by comparing the phase of the shift signal 413b which was determined by performing frequency analysis on the center portion in the signal width (stable region) out of the third intermittent light-receiving signal 413 at 120 MHz–7.5 MHz, and the phase of the comparison signal 411a which was determined by performing frequency analysis on the center portion in the signal width (stable region) out of the first intermittent light-receiving signal 411 at 120 MHz–7.5 MHz as well. As indicated in FIG. 3, the measurement point P1 and the measurement point P3 exist on the same plane of the measurement target 70. Since no time-series change occurs to the phases of the acquired data in this state, the phase of the shift signal 413b, determined by performing the frequency analysis on the center portion in the signal width (stable region) out of the third intermittent light-receiving signal 413, matches with the phase of the comparison signal 411a, determined by performing the frequency analysis on the center portion in the signal width (stable region) out of the first intermittent light-receiving signal 411, as indicated in FIG. 5.

On the other hand, the control arithmetic unit 37 executes error determination control by comparing the phase of the shift signal 414b and the phase of the comparison signal 412a, both modulated with 120 MHz+7.5 MHz. Specifically, the control arithmetic unit 37 executes the error determination control by comparing the phase of the shift signal 414b, which was determined by performing frequency analysis on the center portion in the signal width (stable region) out of the fourth intermittent light-receiving signal 414 at 120 MHz+7.5 MHz, and the phase of the comparison signal 412a, which was determined by performing frequency analysis on the center portion in the signal width (stable region) out of the second intermittent light-receiving signal 412 at 120 MHz+7.5 MHz as well. As illustrated in FIG. 3, a step difference of the measurement target 70 exists between the measurement point P2 and the measurement point P4. Since a time-series change occurs to the phases of the acquired data in this case, the phase of the shift signal 414b, determined by performing the frequency analysis on the center portion in the signal width (stable region) of the fourth intermittent light-receiving signal 414, does not match with the phase of the comparison signal 412a, determined by performing the frequency analysis on the center portion in the signal width (stable region) out of the second intermittent light-receiving signal 412, as indicated in FIG. 5.

In the case where the phase difference between the phase of the shift signal and the phase of the intermittent light-receiving signal is a predetermined threshold value or more, the control arithmetic unit 37 executes the control to eliminate the intermittent light-receiving signal. The control arithmetic unit 37 sets the predetermined threshold value in accordance with the distance of the measurement target 70. The control arithmetic unit 37 of the present embodiment sequentially executes this error determination control.

In some cases, the phase of the shift signal 413b acquired by the control arithmetic unit 37 may be inverted from the phase of the comparison signal 411a. In other words, the phase of the shift signal 413b acquired by the control arithmetic unit 37 may be shifted from the phase of the comparison signal 411a by $\pi$ (180°). For example, in some cases, the shift signal 413b may have a $-\cos$ waveform, and the comparison signal 411a may have a cos waveform. In this case, the control arithmetic unit 37 executes the error determination control by inverting one of the phases of the shift signal 413b and the comparison signal 411a, and comparing one of the phases of the shift signal 413b and the comparison signal 411a which was inverted, and the other of the phases of the shift signal 413b and the comparison signal 411a which was not inverted. Thereby the control arithmetic unit 37 can execute the error determination control in the same way as the above-mentioned error determination control. This is the same for the case of the error determination control executed by comparing the phase of the shift signal 414b and the phase of the comparison signal 412a.

In the example indicated in FIG. 5, the control arithmetic unit 37 acquires the shift signal 413b from the third intermittent light-receiving signal 413, but the shift signal, generated by shifting the phase from the comparison signal 411a by $-\pi/2$ ($-90°$) may be acquired with respect to the light-receiving signal at the center portion in the signal width out of the first intermittent light-receiving signal 411. In this case, the control arithmetic unit 37 executes the error determination control by comparing the phase of this shift signal and the phase of the comparison signal 413a. Further, the control arithmetic unit 37 acquires the shift signal 414b from the fourth intermittent light-receiving signal 414, but the shift signal, generated by shifting the phase with respect to the comparison signal 412a by $\pi/2$ (90°), may be acquired from the light-receiving signal at the center portion in the signal width out of the second intermittent light-receiving signal 412. In this case, the control arithmetic unit 37 executes the error determination control by comparing the phase of this shift signal and the phase of the comparison signal 414a.

According to the light wave distance meter 20 of the present embodiment, the control arithmetic unit 37 acquires the shift signals 413b and 414b by shifting the phase of at least one of the following signals by $2\pi \cdot n - \pi/2$ or $2\pi \cdot n + \pi/2$: the first intermittent light-receiving signal 411 corresponding to the first distance measuring light 231 emitted by the first pulse modulation signal s2; the second intermittent light-receiving signal 412 corresponding to the second distance measuring light 232 emitted by the second pulse modulation signal s3; the third intermittent light-receiving signal 413 corresponding to the third distance measuring light 233 emitted by the third pulse modulation signal s4, which has been shifted by the time corresponding to $2\pi \cdot n -$ $\pi/2$ or $2\pi \cdot n + \pi/2$; and the fourth intermittent light-receiving signal 414 corresponding to the fourth distance measuring light 234 emitted by the fourth pulse modulation signal s5, which has been shifted by time equivalent to $2\pi \cdot n - \pi/2$ or $2\pi \cdot n + \pi/2$ (the phases of the third and fourth intermittent light-receiving signals 413 and 414 are acquired in the case of the present embodiment). Thereby in the case where the measurement target 70 does not have a step difference, the time-series-based change does not occur to the phases of the acquired data, hence the phase of the shift signals 413*b* and 414*b* match with the phase of the intermittent light-receiving signals modulated with a same frequency (match with the phases of the comparison signals 411*a* and 412*a* of the first and second intermittent light-receiving signals 411 and 412 in the case of the present embodiment). Then the control arithmetic unit 37 executes the error determination control by comparing the phases of the shift signals 413*b* and 414*b* and the phase of the intermittent light-receiving signals modulated with a same frequency (comparison signals 411*a* and 412*a* of the first and second intermittent light-receiving signals 411 and 412 in the case of present embodiment). As described above, the light wave distance meter 20 according to the present embodiment uses data on the phases which are distant in the time-series, for the error determination, whereby the accuracy of the error determination can be improved, and the elimination rate of errors in the measurement distance values can be improved.

The control arithmetic unit 37 also compares the phases of the shift signals 413*b* and 414*b* determined by performing frequency analysis on the center portion in the signal width (266 ns in the present embodiment), and the phases of the first and second intermittent light-receiving signals 411 and 412 determined by performing frequency analysis on the center portion in the signal width (266 ns in the present embodiment). Therefore, the control arithmetic unit 37 can compare the phases of the shift signals 413*b* and 414*b* in a relatively clear and stable region, and the phases of the first and second intermittent light-receiving signals 411 and 412 in a relatively clear and stable region. Thereby the light wave distance meter 20 of the present embodiment can further improve the accuracy of the error determination, and can further improve the elimination rate of errors in the measurement distance values.

Further, in a case where the phase difference of the phases of the shift signals 413*b* and 414*b* and the phase of the first and second intermittent light-receiving signals 411 and 412 is a predetermined threshold value or more, the control arithmetic unit 37 eliminates the intermittent light-receiving signals (the second intermittent light-receiving signal 412 and the fourth intermittent light-receiving signal 414 in the case of present embodiment). Therefore using valid light-receiving signals in which the phase difference between the phases of the shift signals 413*b* and 414*b* and the phases of the first and second intermittent light-receiving signals 411 and 412 is less than the predetermined threshold, the light wave distance meter 20 according to the present embodiment can eliminate the light-receiving signals of which phase difference between the phases of the shift signals 413*b* and 414*b* and the phases of the first and second intermittent light-receiving signals 411 and 412 is a predetermined threshold value or more, and can execute the elimination of the errors in the measurement distance values more accurately.

Further, by using the valid light-receiving signals in which the phase difference between the phases of the shift signals 413*b* and 414*b* and the phases of the first and second intermittent light-receiving signals 411 and 412 is less than the predetermined threshold value, which is set in accordance with the distance to the measurement target 70, the control arithmetic unit 37 eliminates the light-receiving signals of which phase difference between the phase of the shift signals 413*b* and 414*b* and the phase of the first and second intermittent light-receiving signals 411 and 412 is the predetermined threshold value or more. Thereby the light wave distance meter 20 according to the present embodiment can execute the elimination of the errors in the measurement distance values more accurately.

Another operation of the control arithmetic unit 37 of the present embodiment will now be described with reference to the drawings.

Figure 6:
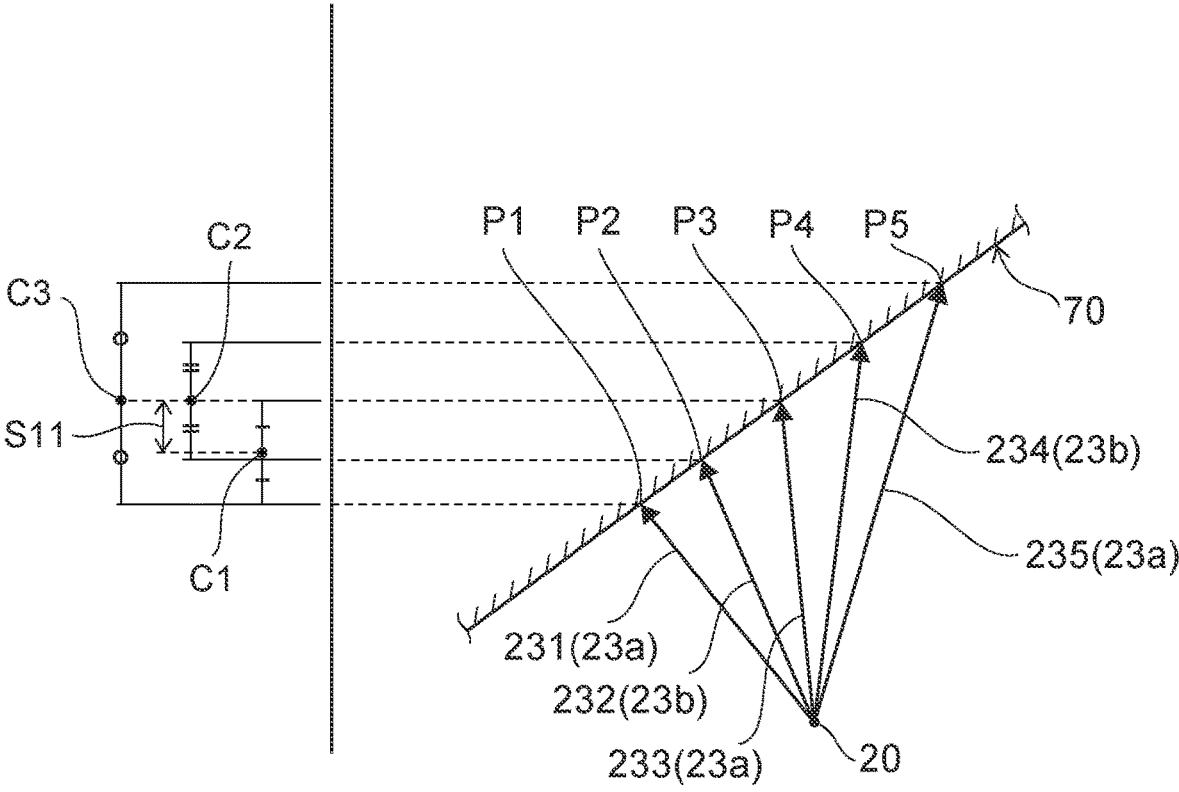
FIG. 6 is a schematic diagram exemplifying a case where a measurement target has inclination.

FIG. 6 is a schematic diagram exemplifying a case where a measurement target has inclination.

The first distance measuring light 231, the second distance measuring light 232, the third distance measuring light 233 and the fourth distance measuring light 234 emitted by the light-emitting element 21 are as described with reference to FIG. 3. The first intermittent light-receiving signal 411, the second intermittent light-receiving signal 412, the third intermittent light-receiving signal 413 and the fourth intermittent light-receiving signal 414 emitted from the light-receiving element 27 are as described with reference to FIG. 3.

As indicated in FIG. 6, in a case where the measurement target 70 has inclination, the center position between the first intermittent light-receiving signal 411 and the third intermittent light-receiving signal 413, both having 120 MHz−7.5 MHz, may deviate from the center position between the second intermittent light-receiving signal 412 and the fourth intermittent light-receiving signal 414, both having 120 MHz+7.5 MHz. Specifically, as indicated by the deviation value S11 in FIG. 6, the center position C1 between the distance value to the measurement point P1 calculated based on the first intermittent light-receiving signal 411 and the distance value to the measurement point P3 calculated based on the third intermittent light-receiving signal 413 may deviate from the center position C2 between the distance value to the measurement point P2 calculated based on the second intermittent light-receiving signal 412 and the distance value to the measurement point P2 calculated based on the fourth intermittent light-receiving signal 414. If the center position C1 deviates from the center position C2, an error is generated in the acquired data.

In this case, the control arithmetic unit 37 of the present embodiment changes the selection of data that is used for calculating the distance value to the measurement target 70, and executes a control to match the center position C3 between the first intermittent light-receiving signals 411 and 415 corresponding to the first distance measuring lights 231 and 235 and the third intermittent light-receiving signal 413 corresponding to the third distance measuring light 233, and the center position C2 between the second intermittent light-receiving signal 412 corresponding to the second distance measuring light 232 and the fourth intermittent light-receiving signal 414 corresponding to the fourth distance measuring light 234.

For example, the control arithmetic unit 37 determines the center position between the first intermittent light-receiving signal 411 and the first intermittent light-receiving signal 415, and determines the center position C3 between the above determined center position and the third intermittent light-receiving signal 413. Thereby the control arithmetic unit 37 matches: the center position C3 based on the first intermittent light-receiving signal 411, the third intermittent light-receiving signal 413 and the first intermittent light-receiving signal 415; and the center position C2 between the second intermittent light-receiving signal 412 and the fourth intermittent light-receiving signal 414.

According to the light wave distance meter 20 of the present embodiment, the center position C3 between the first intermittent light-receiving signals 411 and 415 and the third intermittent light-receiving signal 413 matches with the center position C2 between the second intermittent light-receiving signal 412 and the fourth intermittent light-receiving signal 414. Therefore, the light wave distance meter 20 according to the present embodiment can control the generation of errors on the acquired data.

The embodiments of the present invention have been described. However, the present invention is not limited to the above embodiments, and may be changed in various ways within the scope not departing from the claims. The configurations of the embodiments may be partially omitted or may be combined arbitrarily in a different manner from the above description.

The invention claimed is:

1. A light wave distance meter comprising:

a distance measuring light-emitting unit that includes a light-emitting element and emits a distance measuring light by driving the light-emitting element;

a light-receiving signal generating unit including a light-receiving element that receives a reflected light from a measurement target and transmits a light-receiving signal; and a control arithmetic unit that computes a distance to the measurement target based on the light-receiving signal, wherein the distance measuring light-emitting unit further comprises:

a reference signal generator configured to transmit a reference frequency signal, which is a continuous signal of a predetermined reference frequency:

a frequency divider configured to generate a first modulation signal modulated with a first frequency using the reference frequency signal and a second modulation signal modulated with a second frequency which is adjacent to the first frequency, and to generate a first pulse modulation signal by pulsing the first modulation signal and a second pulse modulation signal by pulsing the second modulation signal;

a phase shifter configured to generate a third pulse modulation signal by shifting the first pulse modulation signal by time equivalent to $2\pi \cdot n - \pi/2$ or $2\pi \cdot n + \pi/2$, and a fourth pulse modulation signal by shifting the second pulse modulation signal by time equivalent to $2\pi \cdot n - \pi/2$ or $2\pi \cdot n + \pi/2$; and a light emission driving unit configured to drive the light-emitting element based on the first pulse modulation signal, the second pulse modulation signal, the third pulse modulation signal and the fourth pulse modulation signal, and to alternately emit, by time division, a first distance measuring light based on the first pulse modulation signal, a second distance measuring light based on the second pulse modulation signal, a third distance measuring light based on the third pulse modulation signal, and a fourth distance measuring light based on the fourth pulse modulation signal, wherein the light-receiving signal includes:

a first intermittent light-receiving signal corresponding to the first distance measuring light;

a second intermittent light-receiving signal corresponding to the second distance measuring light;

a third intermittent light-receiving signal corresponding to the third distance measuring light; and a fourth intermittent light-receiving signal corresponding to the fourth distance measuring light, wherein the control arithmetic unit executes an error determination control to acquire a shift signal generated by shifting at least a phase of any one of the first to fourth intermittent light-receiving signals by $2\pi \cdot n - \pi/2$ or $2\pi \cdot n + \pi/2$, and compares the phase of the shift signal determined by performing frequency analysis on a center portion in a signal width of the intermittent light-receiving signal to acquire the shift signal, and the phase of the intermittent light-receiving signal determined by performing frequency analysis on the center portion in the signal width of the intermittent light-receiving signal at least between either the first frequencies or between the second frequencies.

2. The light wave distance meter according to claim 1, wherein the control arithmetic unit executes a control to eliminate the intermittent light-receiving signal in a case where a phase difference between the phase of the shift signal and the phase of the intermittent light-receiving signal is a predetermined threshold value or more.

3. The light wave distance meter according to claim 2, wherein the control arithmetic unit sets the predetermined threshold value in accordance with the distance to the measurement target.

4. A light wave distance meter comprising:

a distance measuring light-emitting unit that includes a light-emitting element and emits a distance measuring light by driving the light-emitting element;

a light-receiving signal generating unit including a light-receiving element that receives a reflected light from a measurement target and transmits a light-receiving signal; and a control arithmetic unit that computes a distance to the measurement target based on the light-receiving signal, wherein the distance measuring light-emitting unit further comprises:

a reference signal generator configured to transmit a reference frequency signal, which is a continuous signal of a predetermined reference frequency;

a frequency divider configured to generate a first modulation signal modulated with a first frequency using the reference frequency signal and a second modulation signal modulated with a second frequency which is adjacent to the first frequency, and to generate a first pulse modulation signal by pulsing the first modulation signal and a second pulse modulation signal by pulsing the second modulation signal;

a phase shifter configured to generate a third pulse modulation signal by shifting the first pulse modulation signal by time equivalent to $2\pi \cdot n - \pi/2$ or $2\pi \cdot n + \pi/2$, and a fourth pulse modulation signal by shifting the second pulse modulation signal by time equivalent to $2\pi \cdot n - \pi/2$ or $2\pi \cdot n + \pi/2$; and a light emission driving unit configured to drive the light-emitting element based on the first pulse modulation signal, the second pulse modulation signal, the third pulse modulation signal and the fourth pulse modulation signal, and to alternately emit, by time division, a first distance measuring light based on the first pulse modulation signal, a second distance measuring light based on the second pulse modulation signal, a third distance measuring light based on the third pulse modulation signal, and a fourth distance measuring light based on the fourth pulse modulation signal, wherein the light-receiving signal includes:

a first intermittent light-receiving signal corresponding to the first distance measuring light;

a second intermittent light-receiving signal corresponding to the second distance measuring light;

a third intermittent light-receiving signal corresponding to the third distance measuring light; and a fourth intermittent light-receiving signal corresponding to the fourth distance measuring light, wherein the control arithmetic unit executes an error determination control to acquire a shift signal generated by shifting at least a phase of any one of the first to fourth intermittent light-receiving signals by $2\pi \cdot n - \pi/2$ or $2\pi \cdot n + \pi/2$, and compares the phase of the shift signal and the phase of the intermittent light-receiving signal at least between either the first frequencies or between the second frequencies, and executes a control to match the center position between the first intermittent light-receiving signal and the third intermittent light-receiving signal, and the center position between the second intermittent light-receiving signal and the fourth intermittent light-receiving signal.

5. The light wave distance meter according to claim 1, wherein the control arithmetic unit executes a control to match the center position between the first intermittent light-receiving signal and the third intermittent light-receiving signal, and the center position between the second intermittent light-receiving signal and the fourth intermittent light-receiving signal.

6. The light wave distance meter according to claim 2, wherein the control arithmetic unit executes a control to match the center position between the first intermittent light-receiving signal and the third intermittent light-receiving signal, and the center position between the second intermittent light-receiving signal and the fourth intermittent light-receiving signal.

7. The light wave distance meter according to claim 3, wherein the control arithmetic unit executes a control to match the center position between the first intermittent light-receiving signal and the third intermittent light-receiving signal, and the center position between the second intermittent light-receiving signal and the fourth intermittent light-receiving signal.

8. The light wave distance meter according to claim 4, wherein the control arithmetic unit compares the phase of the shift signal determined by performing frequency analysis on a center portion in a signal width of the intermittent light-receiving signal to acquire the shift signal, and the phase of the intermittent light-receiving signal determined by performing frequency analysis on the center portion in the signal width of the intermittent light-receiving signal.

9. The light wave distance meter according to claim 4, wherein the control arithmetic unit executes a control to eliminate the intermittent light-receiving signal in a case where a phase difference between the phase of the shift signal and the phase of the intermittent light-receiving signal is a predetermined threshold value or more.

10. The light wave distance meter according to claim 9, wherein the control arithmetic unit sets the predetermined threshold value in accordance with the distance to the measurement target.

* * * * *